US009505626B2

(12) United States Patent
Davis et al.

(10) Patent No.: US 9,505,626 B2
(45) Date of Patent: Nov. 29, 2016

(54) MOLECULAR SIEVE SSZ-101

(71) Applicants: Tracy Margaret Davis, Novato, CA (US); Joel Schmidt, Pasadena, CA (US); Dan Xie, Richmond, CA (US)

(72) Inventors: Tracy Margaret Davis, Novato, CA (US); Joel Schmidt, Pasadena, CA (US); Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 339 days.

(21) Appl. No.: 14/480,818

(22) Filed: Sep. 9, 2014

(65) Prior Publication Data

US 2016/0068400 A1   Mar. 10, 2016

(51) Int. Cl.
*C01B 39/48* (2006.01)
*C01B 39/46* (2006.01)
*B01J 20/18* (2006.01)
*B01J 29/70* (2006.01)
*B01J 29/06* (2006.01)
*C01B 39/04* (2006.01)

(52) U.S. Cl.
CPC .............. *C01B 39/46* (2013.01); *B01J 20/18* (2013.01); *B01J 29/06* (2013.01); *B01J 29/70* (2013.01); *C01B 39/04* (2013.01); *C01B 39/48* (2013.01)

(58) Field of Classification Search
CPC ....... C01B 39/04; C01B 39/48; C01B 20/18; B01J 29/06; B01J 29/70
See application file for complete search history.

(56) References Cited

U.S. PATENT DOCUMENTS

| | | | | |
|---|---|---|---|---|
| 5,958,370 A | * | 9/1999 | Zones | B01D 53/02 208/111.01 |
| 6,218,591 B1 | * | 4/2001 | Lee | C01B 39/48 208/137 |
| 6,444,191 B1 | * | 9/2002 | Nakagawa | C01B 37/02 423/706 |
| 8,900,548 B2 | * | 12/2014 | Burton | B01J 29/70 423/706 |
| 2009/0214418 A1 | | 8/2009 | Burton et al. | |
| 2016/0068400 A1 | * | 3/2016 | Davis | C01B 39/46 423/718 |
| 2016/0068401 A1 | * | 3/2016 | Davis | C01B 39/48 423/704 |
| 2016/0068402 A1 | * | 3/2016 | Liu | C01B 39/06 423/703 |
| 2016/0068403 A1 | * | 3/2016 | Liu | C01B 39/48 423/704 |

FOREIGN PATENT DOCUMENTS

WO        2013184228        12/2013

OTHER PUBLICATIONS

Casci et al, Template Design for High-Silica Zeotypes: A Case Study of Zeolite NES Synthesis Susing a Designed Template, Studies in Surface Science and Catalysis, (2004) pp. 110-117.*
Y. Nakagawa, G.S. Lee, T.V. Harris, L.T. Yuen and S.I. Zones "Guest/host relationships in zeolite synthesis: ring-substituted piperidines and the remarkable adamantane mimicry by 1-azoniospiro [5.5] undecanes" Micropor. Mesopor. Mater. 1998, 22, 69-85.
S.I. Zones, A.W. Burton, G.S. Lee and M.M. Olmstead "A Study of Piperidinium Structure-Directing Agents in the Synthesis of Silica Molecular Sieves under Fluoride-Based Conditions" J. Am. Chem. Soc. 2007, 129, 9066-9079.
International Search Report, International Application No. PCT/US2015/020110, mailed Nov. 26, 2015.

* cited by examiner

*Primary Examiner* — David M Brunsman
(74) *Attorney, Agent, or Firm* — Terrence M. Flaherty

(57) ABSTRACT

A new crystalline molecular sieve designated SSZ-101 is disclosed. SSZ-101 is synthesized using a N-cyclohexylmethyl-N-ethylpiperidinium cation as a structure directing agent.

10 Claims, 2 Drawing Sheets

MOLECULAR SIEVE SSZ-101

TECHNICAL FIELD

This disclosure relates to a new crystalline molecular sieve designated SSZ-101, a method for preparing SSZ-101, and uses for SSZ-101.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Although many different crystalline molecular sieves have been discovered, there is a continuing need for new molecular sieves with desirable properties for gas separation and drying, hydrocarbon conversion reactions, and other applications. New molecular sieves can contain novel internal pore architectures, providing enhanced selectivities in these processes.

SUMMARY

The present disclosure is directed to a new family of molecular sieves with unique properties, referred to herein as "molecular sieve SSZ-101" or simply "SSZ-101."

In one aspect, there is provided a molecular sieve having a mole ratio of at least 5 of (1) at least one oxide of at least one tetravalent element to (2) optionally, one or more oxides selected from the group consisting of oxides of trivalent elements, pentavalent elements, and mixtures thereof, and having, in its as-synthesized form, the X-ray diffraction lines of Table 5. It should be noted that the phrase "mole ratio of at least 5" includes the case where there is no oxide (2), i.e., the mole ratio of oxide (1) to oxide (2) is infinity. In that case, the molecular sieve is comprised of essentially all of the oxide of the one or more tetravalent elements.

In another aspect, there is provided a method of preparing a crystalline molecular sieve by contacting under crystallization conditions (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; and (5) a N-cyclohexylmethyl-N-ethylpiperidinium cation.

In yet another aspect, there is provided a process for preparing a crystalline molecular sieve having, in its as-synthesized form, the X-ray diffraction lines of Table 5, by: (a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a N-cyclohexylmethyl-N-ethylpiperidinium cation; and (6) water; and (b) subjecting the reaction mixture to crystallization conditions sufficient to form crystals of the molecular sieve.

The present disclosure also provides a novel molecular sieve designated SSZ-101 having a composition, as-synthesized and in the anhydrous state, in terms of mole ratios, as follows:

|  | Broad | Exemplary |
|---|---|---|
| $TO_2/X_2O_b$ | ≥5 | 5 to 50 |
| $Q/TO_2$ | 0.02 to 0.10 | 0.02 to 0.10 |
| $M/TO_2$ | 0.02 to 0.15 | 0.02 to 0.15 | wherein: (1) T is selected from the group consisting of tetravalent elements from Groups 4-14 of the Periodic Table, and mixtures thereof; (2) X is selected from the group consisting of trivalent and pentavalent elements from Groups 3-13 of the Periodic Table, and mixtures thereof; (3) stoichiometric variable b equals the valence state of compositional variable X (e.g., when X is trivalent, b=3; when X is pentavalent, b=5); (4) Q is a N-cyclohexylmethyl-N-ethylpiperidinium cation; and (5) M is selected from the group consisting of elements from Groups 1 and 2 of the Periodic Table;

DETAILED DESCRIPTION

Introduction

Figure 1:
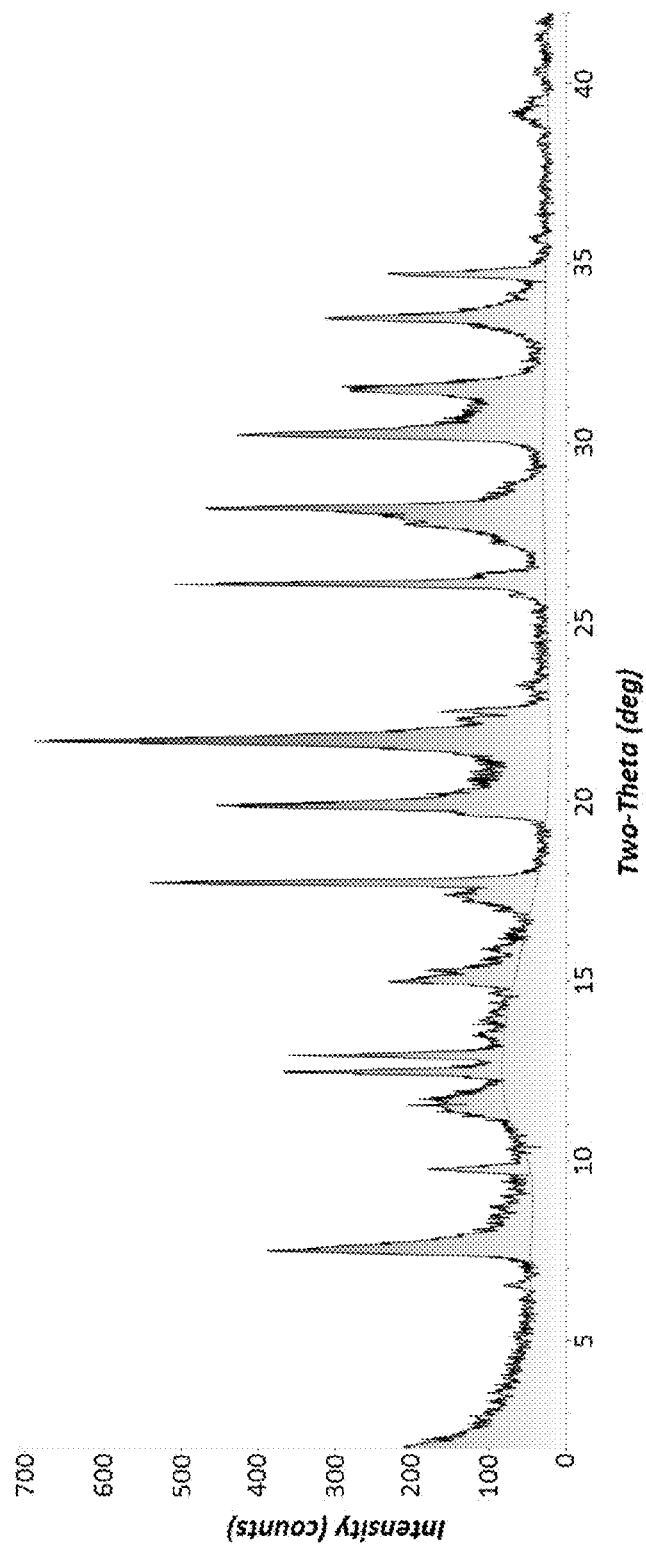
FIG. 1 is a powder X-ray diffraction (XRD) pattern of the as-synthesized molecular sieve prepared in Example 2.

The following terms will be used throughout the specification and will have the following meanings unless otherwise indicated.

The term "molecular sieve" includes (a) intermediate and (b) final or target molecular sieves and molecular sieves produced by (1) direct synthesis or (2) post-crystallization treatment (secondary synthesis). Secondary synthesis techniques allow for the synthesis of a target material from an intermediate material by heteroatom lattice substitution or other techniques.

As used herein, the numbering scheme for the Periodic Table Groups is as disclosed in Chem. Eng. News, 63(5), 27 (1985).

In preparing SSZ-101, a N-cyclohexylmethyl-N-ethylpiperidinium cation is used as the structure directing agent ("SDA"), also known as a crystallization template. The SDA useful for making SSZ-101 is represented by the following structure (1):

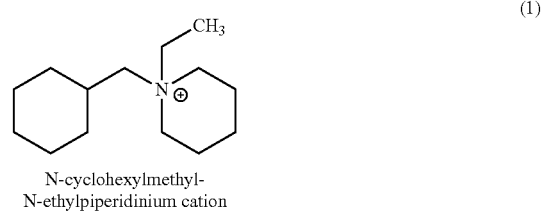

N-cyclohexylmethyl-N-ethylpiperidinium cation

The SDA cation is associated with anions which can be any anion that is not detrimental to the formation of SSZ-101. Representative anions include elements from Group 17 of the Periodic Table (e.g., fluoride, chloride, bromide and iodide), hydroxide, acetate, sulfate, tetrafluoroborate, carboxylate, and the like.

Reaction Mixture

In general, molecular sieve SSZ-101 is prepared by: (a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a N-cyclohexylmethyl-N-ethylpiperidinium cation and (6) water; and (b) subjecting the reaction mixture to crystallization conditions sufficient to form crystals of the molecular sieve.

The composition of the reaction mixture from which the molecular sieve is formed, in terms of mole ratios, is identified in Table 1 below:

TABLE 1

| Components | Broad | Exemplary |
| --- | --- | --- |
| $TO_2/X_2O_b$ | ≥5 | 5 to 50 |
| $M/TO_2$ | 0.05 to 1.0 | 0.20 to 0.80 |
| $Q/TO_2$ | 0.05 to 0.50 | 0.05 to 0.25 |
| $OH/TO_2$ | 0.10 to 1.0 | 0.20 to 0.80 |
| $H_2O/TO_2$ | 15 to 100 | 25 to 60 | wherein compositional variables T, X, M, and Q and stoichiometric variable b are as described herein above.

In one sub-embodiment, the composition of the reaction mixture from which SSZ-101 is formed, in terms of mole ratios, is identified in Table 2 below:

TABLE 2

| Components | Broad | Exemplary |
| --- | --- | --- |
| $SiO_2/Al_2O_3$ | ≥5 | 5 to 50 |
| $M/SiO_2$ | 0.05 to 1.0 | 0.20 to 0.80 |
| $Q/SiO_2$ | 0.05 to 0.50 | 0.05 to 0.25 |
| $OH/SiO_2$ | 0.10 to 1.0 | 0.20 to 0.80 |
| $H_2O/SiO_2$ | 15 to 100 | 25 to 60 | wherein compositional variables M and Q and stoichiometric variable b are as described herein above.

As noted above, for each embodiment described herein, T is selected from the group consisting of tetravalent elements from Groups 4-14 of the Periodic Table. In one sub-embodiment, T is selected from the group consisting of silicon (Si), germanium (Ge), titanium (Ti), and mixtures thereof. In another sub-embodiment, T is selected from the group consisting of Si, Ge, and mixtures thereof. In one sub-embodiment, T is Si. Sources of elements selected for compositional variable T include oxides, hydroxides, acetates, oxalates, ammonium salts and sulfates of the element(s) selected for T. In one sub-embodiment, each source(s) of the element(s) selected for composition variable T is an oxide. Where T is Si, sources useful for silicon include fumed silica, precipitated silicates, silica hydrogel, silicic acid, colloidal silica, tetra-alkyl orthosilicates (e.g., tetraethyl orthosilicate), and silica hydroxides. Sources useful herein for Ge include germanium oxide and germanium ethoxide.

For each embodiment described herein, X is selected from the group consisting of trivalent and pentavalent elements from Groups 3-13 of the Periodic Table. In one sub-embodiment, X is selected from the group consisting of boron (B), aluminum (Al), gallium (Ga), indium (In), iron (Fe), and mixtures thereof. In another sub-embodiment, X is selected from the group consisting of B, Al, Ga, In, and mixtures thereof. In one sub-embodiment X is Al. Sources of elements selected for compositional variable X include oxides, hydroxides, acetates, oxalates, ammonium salts and sulfates of the element(s) selected for X. Where X is Al, sources useful for aluminum include aluminates, alumina, and aluminum compounds such as $AlCl_3$, $Al_2(SO_4)_3$, $Al(OH)_3$, kaolin clays, and other zeolites. An example of the source of aluminum oxide is zeolite Y. Boron, gallium, indium, titanium, and iron can be added in forms corresponding to their aluminum and silicon counterparts.

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, oxalates, citrates and acetates thereof.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) subjecting the reaction mixture to crystallization conditions sufficient to form crystals of the molecular sieve (see, e.g., H. Robson, "*Verified Syntheses of Zeolitic Materials*," Second Revised Edition, Elsevier, 2001).

The reaction mixture is maintained at an elevated temperature until the crystals of the molecular sieve are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by the skilled artisan that the molecular sieves described herein can contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for compositional variable T used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by the skilled artisan sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve can also be achieved by removing heteroatoms from the lattice by known techniques such as acid leaching.

The molecular sieve made from the process disclosed herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying or dried (or partially dried) and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

Characterization of the Molecular Sieve

Molecular sieves made by the process disclosed herein have a composition (in terms of mole ratios), as-synthesized and in the anhydrous state, as described in Table 3 below:

TABLE 3

|  | Broad | Exemplary |
|---|---|---|
| $TO_2/X_2O_b$ | ≥5 | 5 to 50 |
| $Q/TO_2$ | 0.02 to 0.10 | 0.02 to 0.10 |
| $M/SiO_2$ | 0.02 to 0.15 | 0.02 to 0.15 | wherein compositional variables T, X, Q and M and stoichiometric variable b are as described herein above.

In one sub-embodiment, the molecular sieves made by the process disclosed herein have a composition (in terms of mole ratios), as-synthesized and in the anhydrous state, as described in Table 4 below:

TABLE 4

|  | Broad | Exemplary |
|---|---|---|
| $SiO_2/Al_2O_3$ | ≥5 | 5 to 50 |
| $Q/SiO_2$ | 0.02 to 0.10 | 0.02 to 0.10 |
| $M/SiO_2$ | 0.02 to 0.15 | 0.02 to 0.15 | wherein compositional variables Q and M are as described herein above:

Molecular sieves synthesized by the process disclosed herein are characterized by their XRD pattern. The X-ray diffraction pattern lines of Table 5 are representative of as-synthesized SSZ-101 made in accordance with this disclosure. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

TABLE 5

Characteristic Peaks for As-Synthesized SSZ-101

| 2-Theta[a] | d-Spacing, nm | Relative Intensity[b] | Peak Broadening[c] | P/N[d] |
|---|---|---|---|---|
| 6.54 | 1.350 | W | Sh | L |
| 7.50 | 1.177 | S | VB | H |
| 9.77 | 0.904 | W | Sh | L |
| 11.56 | 0.765 | W | Sh | L |
| 12.47 | 0.709 | W | Sh | H |
| 12.95 | 0.683 | W | Sh | H |
| 15.00 | 0.590 | W | B | L |
| 15.90 | 0.557 | W | Sh | L |
| 17.36 | 0.510 | W | B | L |
| 17.76 | 0.499 | M | Sh | H |
| 19.89 | 0.446 | M | B | H |
| 21.68 | 0.410 | VS | VB | H |
| 22.50 | 0.395 | W | Sh | L |
| 23.24 | 0.382 | W | Sh | L |
| 26.06 | 0.342 | M | Sh | H |
| 28.18 | 0.316 | VS | VB | H |

[a] ±0.20 degrees
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).
[c] Peak Broadening is characterized by the Full-Width at Half Maximum (FWHM) of the XRD peak. Based on the FWHM values, the peaks are classified as: Sh = sharp (≤2 * smallest FWHM); B = broad (>2 * smallest FWHM to ≤4 * smallest FWHM); VB = very broad (>4 * smallest FWHM).
[d] P/N is the peak to noise ratio which is calculated as P/N = (Peak Height − Background)/√Peak Height. L = low (≤10); H = high (>10).

The X-ray diffraction pattern lines of Table 6 are representative of calcined SSZ-101 made in accordance with this disclosure.

TABLE 6

Characteristic Peaks for Calcined SSZ-101

| 2-Theta[a] | d-Spacing, nm | Relative Intensity[b] | Peak Broadening[c] | P/N[d] |
|---|---|---|---|---|
| 6.21 | 1.422 | W | Sh | L |
| 7.50 | 1.178 | VS | B | H |
| 9.76 | 0.905 | W | Sh | L |
| 11.62 | 0.761 | W | Sh | L |
| 12.47 | 0.709 | M | Sh | H |
| 12.88 | 0.687 | S | B | H |
| 14.92 | 0.593 | W | Sh | L |
| 15.83 | 0.559 | W | Sh | L |
| 17.44 | 0.508 | W | B | L |
| 17.70 | 0.501 | S | B | H |
| 19.81 | 0.448 | VS | VB | H |
| 20.50 | 0.433 | W | Sh | L |
| 21.66 | 0.410 | VS | B | H |
| 22.25 | 0.399 | W | B | L |
| 23.65 | 0.376 | W | Sh | L |
| 25.98 | 0.343 | VS | B | H |
| 28.19 | 0.316 | VS | B | H |

[a]±0.20 degrees
[b]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).
[c]Peak Broadening is characterized by the Full-Width at Half Maximum (FWHM) of the XRD peak. Based on the FWHM values, the peaks are classified as: Sh = sharp (≤2 * smallest FWHM); B = broad (>2 * smallest FWHM to ≤4 * smallest FWHM); VB = very broad (>4 * smallest FWHM).
[d]P/N is the peak to noise ratio which is calculated as P/N = (Peak Height − Background)/√Peak Height. L = low (≤10); H = high (>10).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Processes Using SSZ-101

SSZ-101 is useful as an adsorbent for gas separations. SSZ-101 can also be used as a catalyst for converting oxygenates (e.g., methanol) to olefins and for making small amines. SSZ-101 can be used to reduce oxides of nitrogen in a gas streams, such as automobile exhaust. SSZ-101 can also be used to as a cold start hydrocarbon trap in combustion engine pollution control systems. SSZ-101 is particularly useful for trapping C$_3$ fragments.

EXAMPLES

The following illustrative examples are intended to be non-limiting.

Example 1

Synthesis of N-Cyclohexylmethyl-N-Ethylpiperidinium Cation

A 1000 mL 3-necked round bottom flask fitted with an overhead stirrer was charged with 24.29 g of triethylamine (TEA), 17.42 g of piperidine and 400 mL of toluene. The mixture was cooled in an ice bath. A dropping funnel was charged with a solution of 29.55 g of cyclohexanecarbonyl chloride in 100 mL of toluene. The cyclohexanecarbonyl chloride solution was then added dropwise to the mixture in the round bottom flask and the mixture was allowed to stir overnight. The reaction mixture was then concentrated under vacuum to remove most of the toluene. Water (113 g) was added to the residual white solid followed by ethyl acetate (200 mL). The organic layer was collected and concentrated under vacuum to provide cyclohexyl-piperidin-1-yl-methanone.

An addition funnel was charged with a solution of 38.82 g of cyclohexyl-piperidin-1-yl-methanone in 200 mL of methylene chloride. A 2 L 3-necked round bottom flask was charged with 350 mL of methylene chloride and 10.17 g of lithium aluminum hydride (LiAlH$_4$). The mixture in the round bottom flask was cooled in an ice bath and kept under a nitrogen atmosphere. The cyclohexyl-piperidin-1-yl-methanone solution was added dropwise to the round bottom flask over two hours. After an additional 30 minutes, the ice bath was removed and the reaction mixture was allowed to warm up to room temperature and allowed to stir overnight. The resulting suspension was then cooled in an ice bath. Water (12 g) was added slowly to the mixture with vigorous stirring followed by 12 g of a 15% aqueous NaOH solution. An additional 50 mL of methylene chloride was added to the mixture to replace some of the evaporated solvent. An additional 40 g of water was added slowly to the mixture. The mixture was then allowed to warm up to room temperature. The solids were filtered and washed two times with methylene chloride to remove any entrained product. The filtrate was collected, dried with sodium sulfate, and concentrated under vacuum to provide 34.15 g of N-cyclohexylmethylpiperidine.

N-Cyclohexylmethylpiperidine (34.15 g) was dissolved in 300 mL of methanol. An addition funnel was charged with a solution of 62 g of ethyl iodide in 100 mL of methanol. The ethyl iodide solution was added dropwise to the N-cyclohexylmethylpiperidine solution and then refluxed for 48 hours. The mixture was concentrated under vacuum to remove most of the ethyl iodide and methanol. N-cyclohexylmethyl-N-ethylpiperidinium iodide (49.9 g) was recrystallized from hot acetone and diethyl ether.

The obtained N-cyclohexylmethyl-N-ethylpiperidinium iodide was dissolved in deionized water (1 mL H$_2$O/1 mmol salt) and then 1.1 g of hydroxide-based ion exchange resin/1 mmol salt was added. The resulting slurry was left to stir gently for a few hours. The slurry was filtered and the filtrate was analyzed by titration of a small aliquot with dilute HCl. The exchange afforded N-cyclohexylmethyl-N-ethylpiperidinium hydroxide in nearly quantitative yield.

Scheme 1 below depicts the synthesis of the N-cyclohexylmethyl-N-ethylpiperidinium cation.

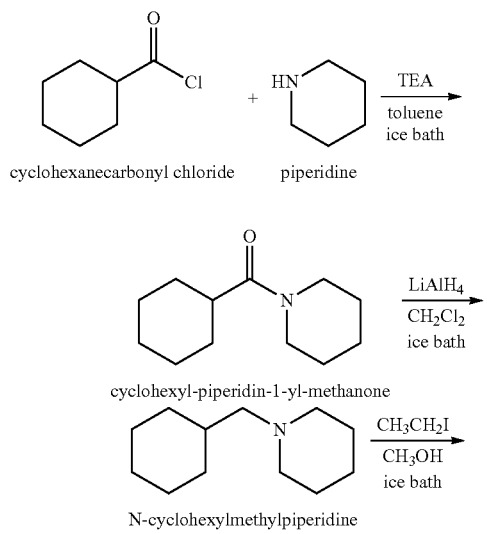

SCHEME 1

-continued

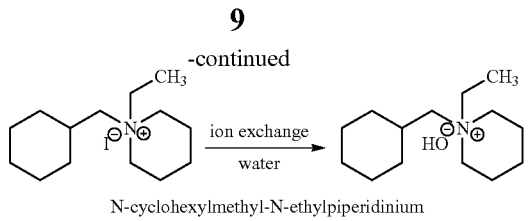

N-cyclohexylmethyl-N-ethylpiperidinium

Example 2

Synthesis of SSZ-101

2.06 g of a sodium silicate solution, 0.28 of USY zeolite (CBV300®, Zeolyst International, $SiO_2/Al_2O_3$ mole ratio=5.1), 1.31 g of 1N NaOH, and 1.36 g of a hydroxide solution of the SDA (1.08 mmol/g) were combined in a 23 mL PEEK cup. The final molar composition of the gel was as follows:

1 $SiO_2$: 0.05 $Al_2O_3$: 35 $H_2O$: 0.1 SDA-OH: 0.6 NaOH

The PEEK cup was capped and sealed in a stainless steel autoclave and heated in an oven for 7-14 days at 135° C. Upon crystallization, the gel was recovered from the autoclave, filtered and washed with deionized water.

The resulting product was analyzed by powder XRD. The resulting XRD pattern is shown in FIG. 1.

The as-synthesized product had a $SiO_2/Al_2O_3$ mole ratio of 8, as determined by ICP elemental analysis.

Example 3

Calcination of SSZ-101

Figure 2:
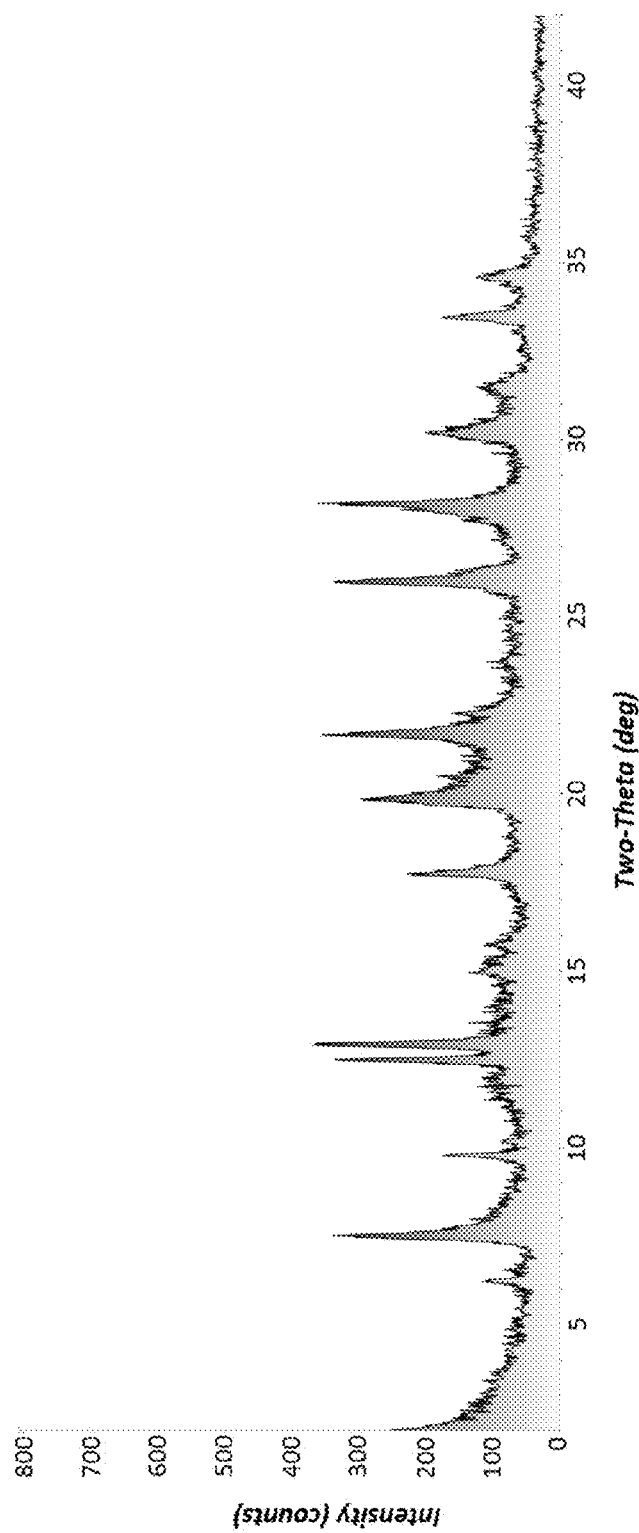
FIG. 2 is a powder XRD pattern of the calcined molecular sieve prepared in Example 3.

The as-synthesized product of Example 2 was calcined inside a muffle furnace under a flow of air heated to 595° C. at a rate of 1° C./minute and held at 595° C. for 5 hours, cooled and then analyzed by powder XRD. The powder XRD pattern of the resulting product is shown in FIG. 2. The powder XRD pattern indicates that the material remains stable after calcination to remove the organic SDA.

Example 4

Micropore Volume Analysis

Calcined SSZ-101 was subjected to a micropore volume analysis using $N_2$ as adsorbate and via the BET method. The molecular sieve exhibited a micropore volume of 0.097 $cm^3/g$.

Example 5

Hydrocarbon Uptake

The adsorption capacity for vapor phase n-hexane of the calcined SSZ-101 of Example 3 was measured as described by C. Y. Chen et al. (*Micropor. Mesopor. Mater.* 2007, 104, 39-45). Calcined SSZ-101 exhibited no uptake of n-hexane at room temperature indicating that SSZ-101 is a small pore molecular sieve (i.e., a molecular sieve having a pore size of from 3 Å to less than 5.0 Å).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A molecular sieve having a mole ratio of at least 5 of (1) at least one oxide of at least one tetravalent element to (2) one or more oxides selected from the group consisting of trivalent elements, pentavalent elements, and mixtures thereof, and having, in its as-synthesized form, an X-ray diffraction pattern substantially as shown in the following Table:

| 2-Theta | d-Spacing, nm | Relative Intensity | Peak Broadening | P/N |
|---|---|---|---|---|
| 6.54 ± 0.20 | 1.350 | W | Sh | L |
| 7.50 ± 0.20 | 1.177 | S | VB | H |
| 9.77 ± 0.20 | 0.904 | W | Sh | L |
| 11.56 ± 0.20 | 0.765 | W | Sh | L |
| 12.47 ± 0.20 | 0.709 | W | Sh | H |
| 12.95 ± 0.20 | 0.683 | W | Sh | H |
| 15.00 ± 0.20 | 0.590 | W | B | L |
| 15.90 ± 0.20 | 0.557 | W | Sh | L |
| 17.36 ± 0.20 | 0.510 | W | B | L |
| 17.76 ± 0.20 | 0.499 | M | Sh | H |
| 19.89 ± 0.20 | 0.446 | M | B | H |
| 21.68 ± 0.20 | 0.410 | VS | VB | H |
| 22.50 ± 0.20 | 0.395 | W | Sh | L |
| 23.24 ± 0.20 | 0.382 | W | Sh | L |
| 26.06 ± 0.20 | 0.342 | M | Sh | H |
| 28.18 ± 0.20 | 0.316 | VS | VB | H. |

2. The molecular sieve of claim 1, wherein the molecular sieve has a composition, as-synthesized and in the anhydrous state, in terms of mole ratios, as follows:

| | |
|---|---|
| $TO_2/X_2O_b$ | 5 to 50 |
| $Q/TO_2$ | 0.02 to 0.10 |
| $M/TO_2$ | 0.02 to 0.15 | wherein:
- (1) T is selected from the group consisting of tetravalent elements from Groups 4-14 of the Periodic Table, and mixtures thereof;
- (2) X is selected from the group consisting of trivalent and pentavalent elements from Groups 3-13 of the Periodic Table, and mixtures thereof;
- (3) b equals the valence state of X;
- (4) Q is a N-cyclohexylmethyl-N-ethylpiperidinium cation; and
- (5) M is selected from the group consisting of elements from Groups 1 and 2 of the Periodic Table.

3. The molecular sieve of claim 2, wherein T is selected from the group consisting of Si, Ge, and mixtures thereof.

4. The molecular sieve of claim 3, wherein T is Si.

5. The molecular sieve of claim 2, wherein X is selected from the group consisting of B, Al, Ga, In, Fe, and mixtures thereof.

6. The molecular sieve of claim 5, wherein X is selected from the group consisting of B, Al, Ga, In, and mixtures thereof.

7. The molecular sieve of claim 2, wherein T is Si and X is Al.

8. A molecular sieve having a mole ratio of at least 5 of (1) at least one oxide of at least one tetravalent element to (2) one or more oxides selected from the group consisting of trivalent elements, pentavalent elements, and mixtures thereof, and having, in its calcined form, an X-ray diffraction pattern substantially as shown following Table:

| 2-Theta | d-Spacing, nm | Relative Intensity | Peak Broadening | P/N |
|---|---|---|---|---|
| 6.21 ± 0.20 | 1.422 | W | Sh | L |
| 7.50 ± 0.20 | 1.178 | VS | B | H |
| 9.76 ± 0.20 | 0.905 | W | Sh | L |
| 11.62 ± 0.20 | 0.761 | W | Sh | L |
| 12.47 ± 0.20 | 0.709 | M | Sh | H |
| 12.88 ± 0.20 | 0.687 | S | B | H |
| 14.92 ± 0.20 | 0.593 | W | Sh | L |
| 15.83 ± 0.20 | 0.559 | W | Sh | L |
| 17.44 ± 0.20 | 0.508 | W | B | L |
| 17.70 ± 0.20 | 0.501 | S | B | H |
| 19.81 ± 0.20 | 0.448 | VS | VB | H |
| 20.50 ± 0.20 | 0.433 | W | Sh | L |
| 21.66 ± 0.20 | 0.410 | VS | B | H |
| 22.25 ± 0.20 | 0.399 | W | B | L |
| 23.65 ± 0.20 | 0.376 | W | Sh | L |
| 25.98 ± 0.20 | 0.343 | VS | B | H |
| 28.19 ± 0.20 | 0.316 | VS | B | H. |

9. The molecular sieve of claim 8, wherein the molecular sieve has a mole ratio of at least 5 of (1) silicon oxide to (2) an oxide selected from boron oxide, aluminum oxide, gallium oxide, indium oxide, iron oxide, and mixtures thereof.

10. The molecular sieve of claim 8, wherein the molecular sieve has a mole ratio of from 5 to 50 of (1) silicon oxide to (2) an oxide selected from boron oxide, aluminum oxide, gallium oxide, indium oxide, and mixtures thereof.

* * * * *